Figure 1:
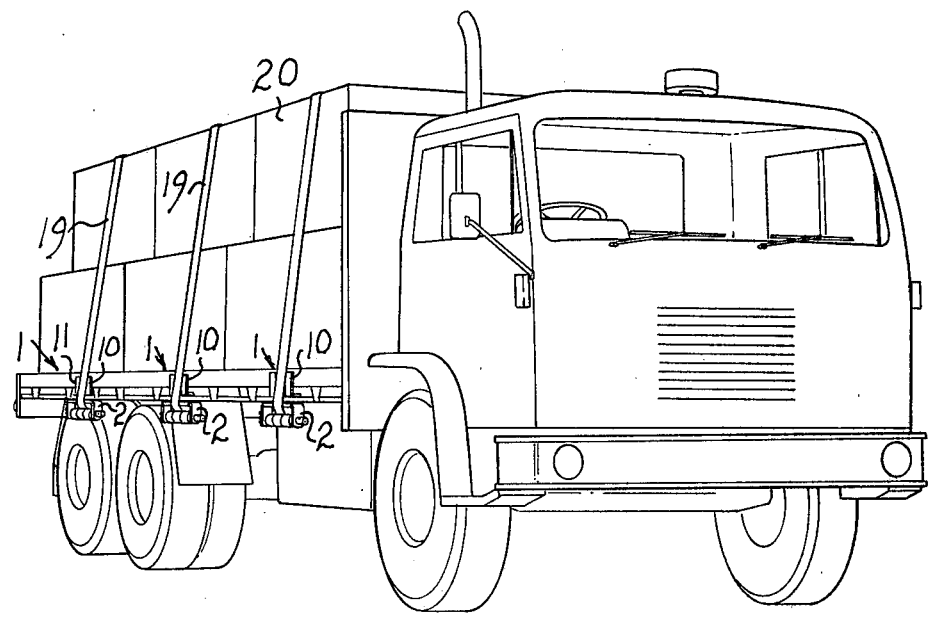

United States Patent [19]

Thomas

[11] 4,382,736
[45] May 10, 1983

[54] BELT WINCH MOUNTING ON VEHICLE RAIL

[76] Inventor: Allan R. Thomas, 39 Samuel St., Maitland, South Australia, Australia

[21] Appl. No.: 65,853

[22] Filed: Aug. 13, 1979

[51] Int. Cl.³ .................. B60P 7/08; B61D 45/00; B66D 1/60

[52] U.S. Cl. .................. 410/104; 410/100; 410/103

[58] Field of Search .......... 410/34, 35, 36, 37, 410/100, 103, 104

[56] References Cited

U.S. PATENT DOCUMENTS

| | | |
|---|---|---|
| Re. 30,307 | 6/1980 | Arbogast .................. 410/37 |
| 2,458,747 | 1/1949 | Singley .................. 410/37 X |
| 3,428,331 | 2/1969 | Morgan et al. .................. 410/100 |
| 4,122,587 | 10/1978 | Weiss et al. .................. 410/100 X |

Primary Examiner—Robert B. Reeves
Assistant Examiner—Howard Beltran
Attorney, Agent, or Firm—Oldham, Oldham, Hudak, Weber & Sand Co.

[57] ABSTRACT

A belt winch apparatus for holding a belt at the side of a load carrying trailer vehicle the apparatus having interlocking means so that the apparatus can be supported by interlocking between the tie rail and the outer side of the vehicle tray and hold the belt under tension holding the load while in the same position.

6 Claims, 5 Drawing Figures

BELT WINCH MOUNTING ON VEHICLE RAIL

This invention relates to means of holding of loads on vehicles.

It is now known to use devices which can be termed "belt winches" though which belts can be held under tension over a load on the tray of a vehicle.

Such devices as are presently known include a belt drum, a ratchet to hold the drum in a position holding the belt under tension, and a sliding support arrangement including a holding frame which is securable to the underneath of the motor vehicle and an interlocking portion on a separate frame assembly supporting the belt drum which is arranged to slide to be engaged within the separate support assembly.

The system as presently used has a number of disadvantages.

A first of these is that the secondary sliding supporting system has in each case to be separately fitted to the motor vehicle tray and of course there must be an area under the tray of the vehicle where this can be fitted and secondly the length of the slide and therefore the position of the belt drum located in, is limited very much by the free area beneath the vehicle.

Furthermore, the position that the belt drum can take is governed once again by the demands of space beneath the vehicle and there is further difficulty that when the belt drum is being tightened or loosened off, access must be gained to the belt drum, and where there have been difficulties in locating the assembly, access can likewise be difficult.

It will be understood that such difficulties can be most apparent around the rear axle support assembly but this is not the only problem area in many cases.

There is a further problem this being one of cost in that for installation there must be several separate operations necessary to install the equipment a first being that the support track must be made as a separate piece of apparatus and secondly this must be attached at a convenient location in such a way that it will withstand the substantial forces to which it will be subjected.

The object of this invention relates to overcoming or at least reducing some of the above problems presently experienced with known support systems for the belt winch concept.

This invention proposes that each belt winch apparatus have interlocking means whereby the apparatus can be interlocked with an existing structure that is conventionally located on substantially all trays of load carrying motor vehicles. This has substantial advantage, both in relation to the cost of manufacture of the apparatus and because of the very much greater freedom that can then be available for locating the belt winch apparatus, and finally especially in relation to preferred embodiments, it has specific advantages in relation to access to the belt winch apparatus for tightening and releasing of the belt.

According to one form of the invention then this can be said to reside in a belt winch apparatus for holding load-holding belts, the apparatus being of a type including a frame supporting with rotatable freedom about its axis, a belt drum, and locking means adapted to releasably lock the rotation of the drum, the apparatus being characterized according to this invention in that there are interlocking means secured to the frame adapted to interlock with and between a tie rail and the side of a vehicle tray as these two features are conventionally arranged in a substantial number of motor vehicles, in such a way that the belt drum can be thus supported beneath the tie rail and in such a position be used to tighten and hold under tension a load-holding belt.

The belt winch apparatus accordingly is locatable at any location along a side or indeed a rear of a vehicle tray and by appropriately shaping the interlocking means, the belt winch portion of the apparatus can be located so as to be easily accessible to an operator but at the same time not protrude beyond the conventional width of the vehicle to any significant extent so that the vehicle width will not exceed statutory road limits even with the belt winch apparatus attached in an operating mode.

According to a preferred arrangement, the interlocking means include a member or members shaped to have, when in the interlocking position, one portion adapted to engage against an inner side of the tie rail, and a second portion to engage the outer side of the load carrying tray of the vehicle above the tie rail these portions co-operatively acting to resist turning of the frame when holding a load-holding belt under tension and there being a further portion to support the apparatus when the apparatus is in the storage state.

Preferably the interlocking means include a tongue or tongues each having a lower end secured to the frame and an upper end aligned with an outer side of the frame.

These last several features can be achieved in a number of differing ways but illustrate how in a relatively uncomplicated mechanical manner one or two members can be used to interlock with the rail and the side of the vehicle tray to provide support for the belt winch apparatus and resistance against any pulling action that might be experienced when a belt is being held under load.

Preferably the interlocking means include a tongue or tongues each having a lower end secured to the frame and having a first portion extending from the frame in a vertical direction, a second portion extending from the first said portion in a horizontal direction and a third portion extending from the second portion in a vertical direction.

Preferably the interlocking means comprise two tongues of the same size and shape and having a lower end secured to the frame at or toward a rear of the frame one tongue being secured at or toward each side of the frame, the two tongues being spaced apart and rising in parallel relationship to each other, a first portion of each rising vertically, a second portion continuing from the first in a forwardly and substantially horizontal position, and a third portion continuing from the second portion and extending vertically and being substantially in a common plane with the forward most edges of the frame and winch drum.

Preferably the frame holding the winch drum is of U-shape and the winch drum is held between the legs of the U-shape.

The invention of course can also reside in a combination of a winch drum apparatus having any one or more of these features when the interlocking means are in fact interlocking with and between the tie rail located below the perimeter of the vehicle tray and the outer side of the vehicle tray.

Figure 2:
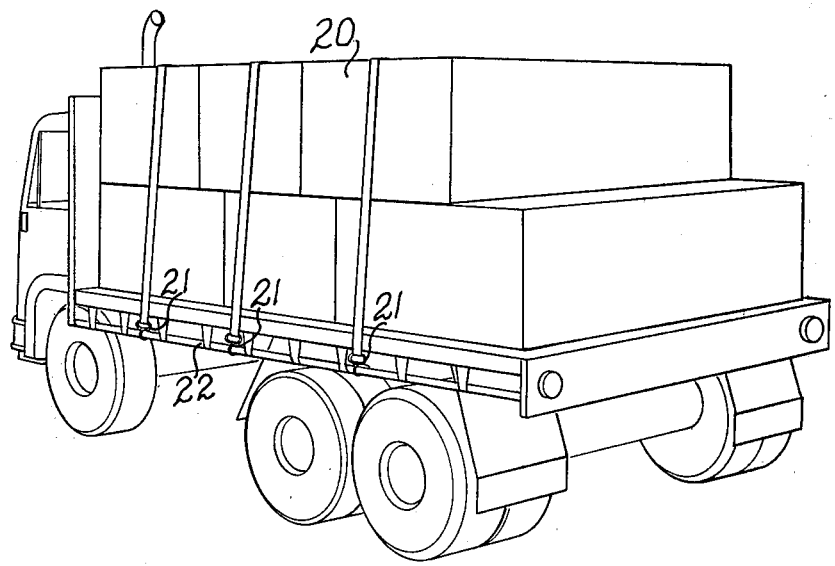
Figure 3:
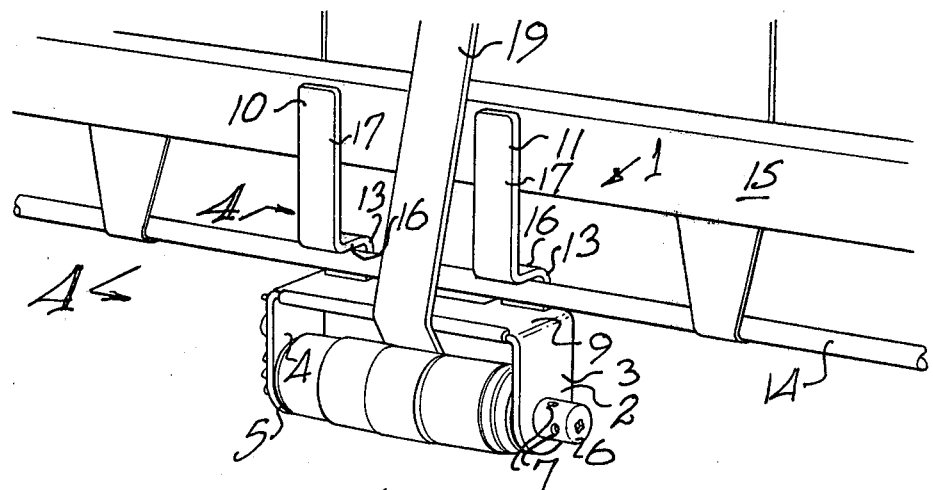
Figure 4:
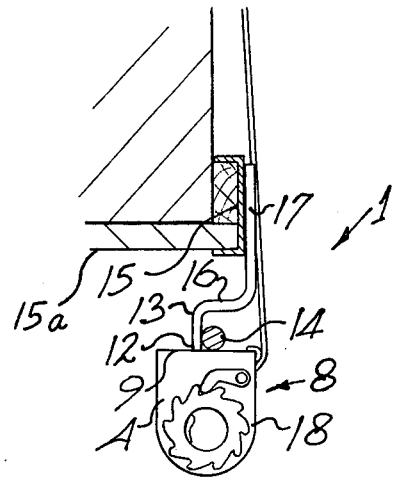
Figure 5:
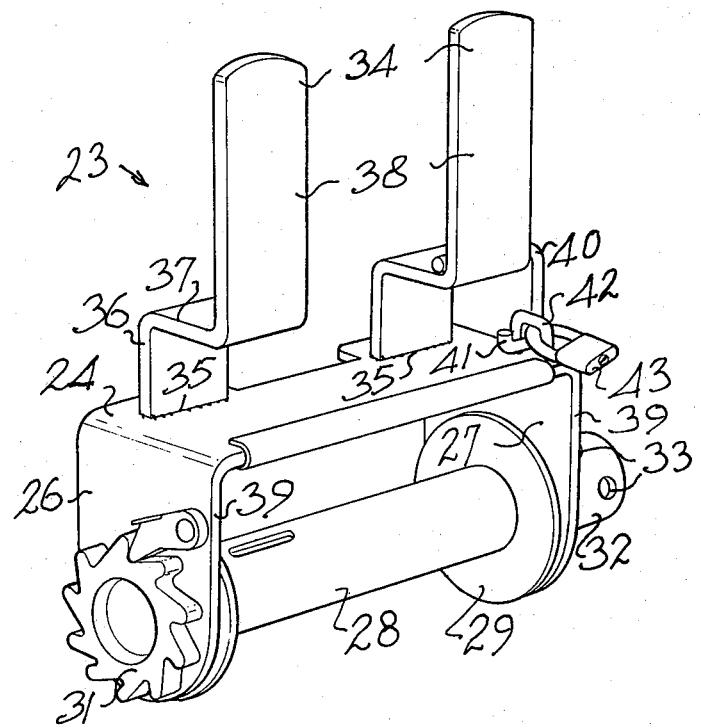

For a better understanding of this invention a preferred embodiment will now be described with the assistance of drawings in which:

FIG. 1 is an illustration of a typical truck with a load carrying tray there being three belt winch apparatuses located along one side of the tray and holding in each case a belt under tension, FIG. 2 is a view of the same vehicle as is shown in FIG. 1 in this case showing the vehicle from the other side and illustrating that the belts are held by conventional clips on the opposite side to the tie rail, FIG. 3 is a perspective view similar to that as shown in FIG. 1 with the details of the belt winch apparatus however according to the preferred embodiment shown in enlarged detail the belt winch apparatus being shown with the belt being held under some tension, FIG. 4 is a partly schematic view generally in cross-section showing a view of the arrangement as shown in FIG. 1 from the direction and position as shown in 4—4 in FIG. 3, and FIG. 5 is a perspective view of the belt winch apparatus once again according to the preferred embodiment as shown in the previous figures but in this case showing a locking device to hold the apparatus with respect to the vehicle against easy theft.

Referring now to the preferred embodiment as particularly shown in FIGS. 1 to 4 the belt winch apparatus 1 has a frame 2 which is generally of U-shape with an inverted location so that legs 3 and 4 are downwardly extending and rotatably retain winch drum 5 therebetween there being at one end a tightening spool 6 having a plurality of apertures 7 by which an engaging tool can be located therein to assist with mechanical advantage in turning of the belt winch 5 and at the other end is a pawl and ratchet arrangement 8 adapted to releasably hold and lock the rotation of the belt drum 5 about its own axis that is the axis about which it is retained for pivotal rotation.

There is a base portion 9 of the frame 2 and there are two tongues 10 and 11 each of the same size and shape and each located so that they will extend parallel one to the other from a securing location on the base 9 of the frame 2.

These tongues 10 and 11 have a lower end 12 secured to the base 9 and from there extend upwardly with a first portion 13 which is located so as to be behind the tie rail 14 of the vehicle 15.

A second portion of the tongues 10 and 11 then continuing from the first portion 13 extends forwardly and horizontally this portion being shown at 16.

A third portion then extends from the second portion 16 in an upward direction this portion being shown at 17 and the portion 17 being generally in a common plane with forward most edges shown at 18 of the frame 2 and also forward most edges of the belt winch 5.

References to rearward and forward directions are intended not to be absolute directions but to be considered as indicating relative positions when the belt winch apparatus 1 is located in a typical position supporting a belt under tension on the side of the motor vehicle tray or floor 15a and the direction rearward is considered as being deeper in toward the vehicle tray and forward is closer to the outside of the tray.

In use each of the belt winch apparatuses 1 are located as desired along the side of a motor vehicle tray or floor 15a especially as shown in FIG. 1 and the belts in each case 19 are pulled over the loads shown at 20 and the belts 19 are secured by hooks 21 to the tie rail 22 located on the other side of the vehicle.

When the belts 19 are not required to hold a load, they can be wound back on the winch drum 5 and left in this position with the belt winch apparatus resting in the position as is shown in FIG. 3.

For location or removal of the belt winch apparatus, it will be obvious that all that is required is that the tongues 10 and 11 be located through the space left between the tie rail 14 and the outer perimeter of the vehicle tray 15 and with this interlocking relationship, the belt winch apparatus is ready to be used and to hold firm any belts needed to be held under tension.

With reference to FIG. 5, this shows the same features as is shown in FIGS. 1 to 4 in relation to the belt winch apparatus there being accordingly a belt winch apparatus 23 having a frame 24 with a base 25 and legs 26 and 27. The legs 26 and 27 secure for rotation about its own axis a belt winch 28 which includes sides 29 and 30 a pawl and spigot arrangement 31 to releasably lock the rotation of the drum 28 and a tightening drum 32 having a plurality of apertures 33 by which the drum 28 can be rotated and tension applied to a belt not shown.

The interlocking means in this case comprise once again two tongues 34 and 35 these being each of the same shape and size and being parallel one to the other each however having a lower end 35 secured rearwardly and to aside of the base 25 of the frame 24.

Each of the tongues 34 then have a first portion 36 rising vertically a second portion 37 extending forwardly and generally horizontally and a third portion 38 rising once again vertically the portion 38 being generally in the same plane as the forward most edge 39 of the frame 24.

A feature in this embodiment however is that there is an interlocking member 40 which is held in a locked position by having an end 41 passing through a loop 42 and a padlock 43 which will stop the end 42 from returning through the loop unless the padlock is released.

This then describes the embodiments from which it will be seen that in relation to the preferred embodiments there is shown a most simple and economic answer to the problems experienced hitherto.

It is to be clearly pointed out that there are other less preferred embodiments incorporating especially differing ways of providing interlocking tongues including for instance providing two tongues rising vertically from a secured point on the base and having a rearwardly extending member in each case extending generally horizontally from the front member and there being a second member in each case extending vertically and being secured at a rear of the base of the frame member there being an adequate gap between the rearwardly extending member and the upwardly rising member to allow for location of the tie rail therebetween.

Such is a typical other way of achieving the answers but as said previously this is not the preferred method but is given to indicate that the concept to include all differing ways is somewhat wider than that precisely described in the preferred embodiment.

It is claimed:

1. A belt winch apparatus for holding load-holding belts on vehicles including load carrying trays and tie rails, the apparatus being of a type including a frame supporting a rotatable belt drum, and locking means adapted to releasably lock the rotation of the drum, the apparatus being characterized by interlocking means secured to the frame and adapted to interlock with and between a tie rail and the side of a vehicle, the tie rail being below and spaced from the vehicle side so that the belt drum can be supported beneath the tie rail in a position to tighten and hold, under tension, a loadholding belt, the interlocking means including a member shaped to have, when in the interlocking position, one portion adapted to engage against a rearward side of the tie rail, and a second portion to engage an outer side of the load carrying tray of the vehicle above the tie rail, these portions cooperatively acting to resist turning of the belt winch apparatus when holding a load-holding belt under tension and a further portion arranged to support the frame even when there is no tension with respect to the belt, and the interlocking means also including a member each having a lower end secured to the frame and an upper end aligned with an outer side of the frame.

2. A belt winch apparatus as in claim 1 in which the interlocking means include a member constituted by a tongue having a lower end secured to the frame and having a first portion extending from the frame in a vertical direction, the second portion extending from the first said portion in a horizontal direction, and a third portion extending from the second portion in a vertical direction.

3. A belt winch apparatus as in claim 1 in which the interlocking means include two members these each being constituted by being a tongue the members each being the same size and shape and having a lower end secured to the frame, one tongue being secured at or toward each side of the frame the two tongues being spaced apart and rising in parallel relationship to each other, the first portion of each rising vertically, a second portion continuing from the first in a forward and substantially horizontal position, and a third portion continuing from the second portion extending vertically and being substantially in a common plane with forward most edges of the frame and winch drum.

4. A belt winch apparatus according to claim 1 in which the frame includes a U-shaped member adapted to be located in an inverted position with the winch drum pivotally located between the legs of the U-shape.

5. A belt winch apparatus according to any one of the preceding claims wherein there are locking means engageable to secure the interlocking means to the tie rail.

6. A belt winch apparatus as in claim 1 in combination with a vehicle including a tray with a tie rail beneath at least some parts of the outer perimeter of the tray, the apparatus being located so that its interlocking means interlock with and between the outer perimeter of the tray and the tie rail to support the apparatus and hold the apparatus against tension when its belt is holding a load.

* * * * *